W. ROBINSON.
ELECTRIC RAILWAY SYSTEM.
APPLICATION FILED APR. 18, 1905.

901,377.

Patented Oct. 20, 1908.

2 SHEETS—SHEET 1.

WITNESSES:

INVENTOR

W. ROBINSON.
ELECTRIC RAILWAY SYSTEM.
APPLICATION FILED APR. 18, 1905.

901,377.

Patented Oct. 20, 1908.

2 SHEETS—SHEET 2.

WITNESSES:

INVENTOR

UNITED STATES PATENT OFFICE.

WILLIAM ROBINSON, OF BROOKLYN, NEW YORK.

ELECTRIC-RAILWAY SYSTEM.

No. 901,377.        Specification of Letters Patent.        Patented Oct. 20, 1908.

Application filed April 18, 1905. Serial No. 256,322.

*To all whom it may concern:*

Be it known that I, WILLIAM ROBINSON, a citizen of the United States, and resident of Brooklyn, in the county of Kings and State of New York, have invented a new and Improved Electric-Railway System, of which the following is a specification.

My invention has particular reference to electric railways in which alternating currents are delivered to, and utilized by, electric motor cars or locomotives.

Figure 1:
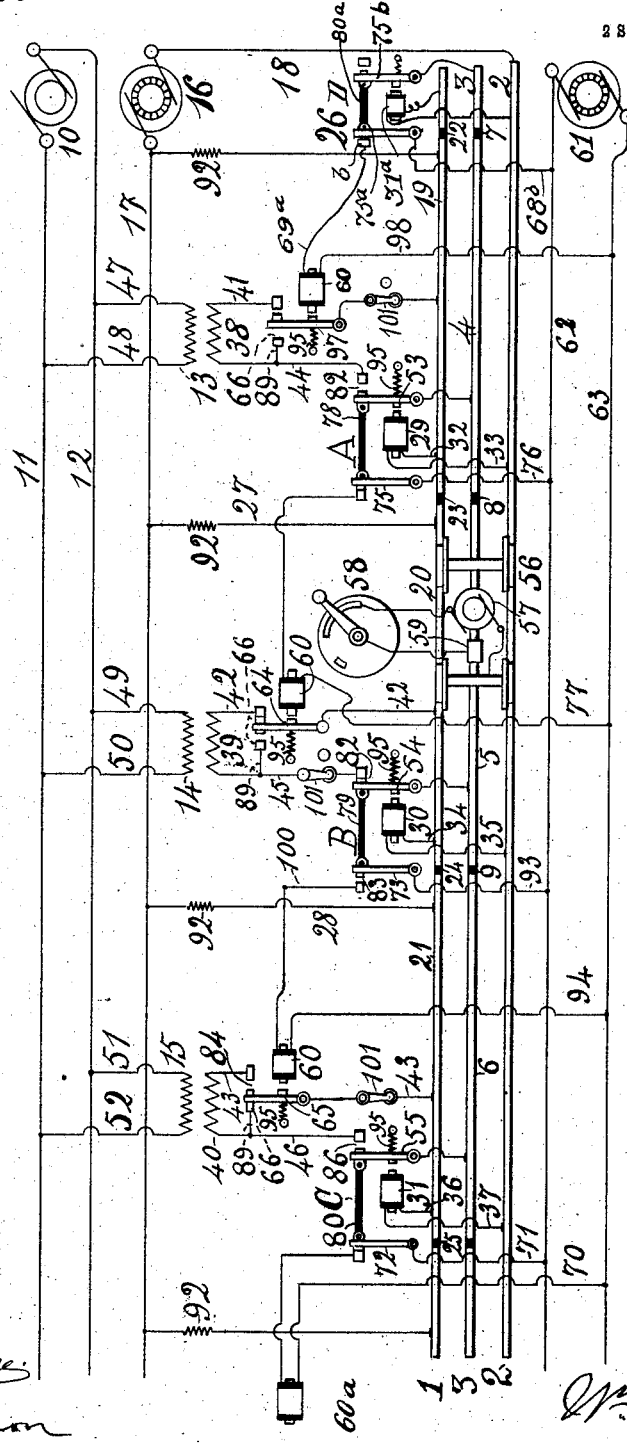
Figure 2:
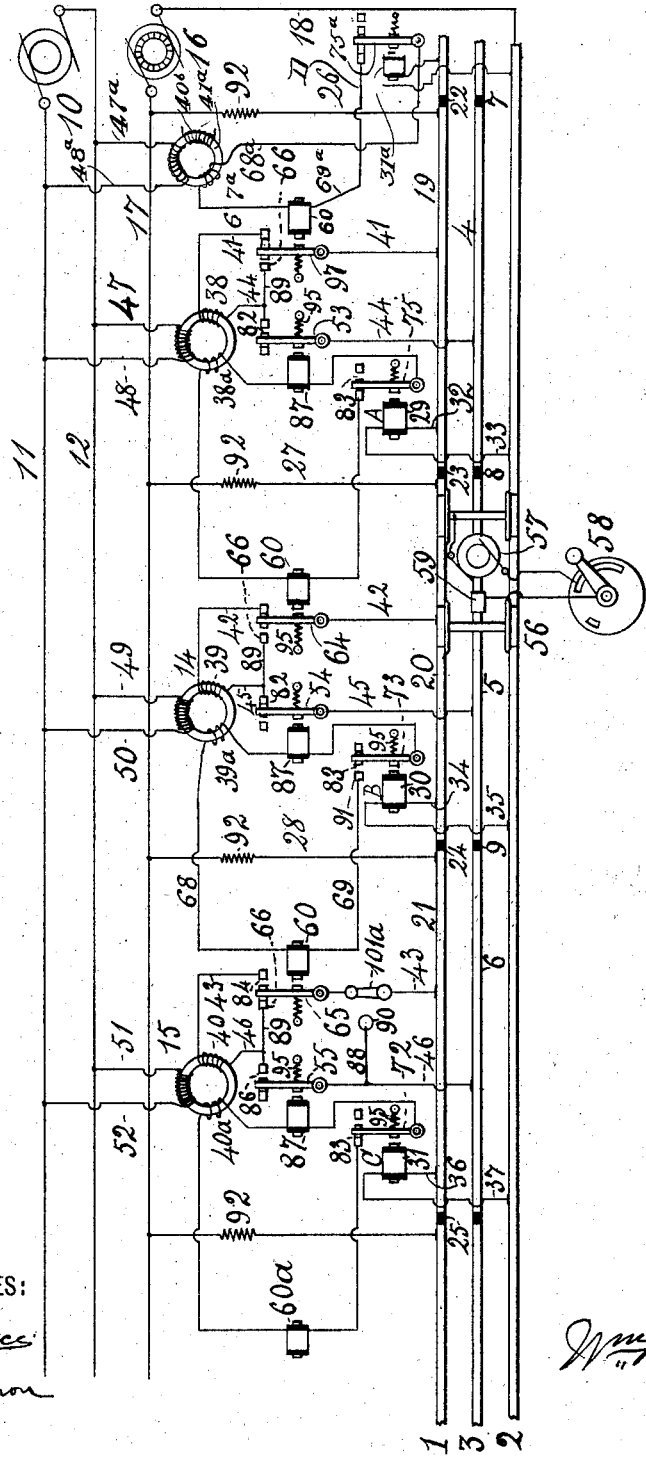

The nature of my invention will be understood from the description which follows, reference being had to the accompanying drawings which form a part of this specification, in which Figure 1 is a diagram illustrating the main features of my invention, and Fig. 2 is a similar diagram showing means for a more complete utilization of the alternating current.

1, 2, represent a railroad track, and 3 a third rail or working conductor made in section 4, 5 and 6, separated or insulated from one another, as shown at 7, 8 and 9.

10 represents a high voltage alternating current generator, from which proceed the leaders 11, 12, to which are connected the step down transformers 13, 14, 15, and $40^b$ located at suitable intervals, by the wires 47, 48, 49, 50, 51 52, $47^a$ and $48^a$. In Fig. 1 each of said transformers has one secondary, and in Fig. 2 each transformer has two secondaries, as hereinafter more fully described.

16 represents a direct current generator of comparatively low potential, and 17 a feeder proceeding therefrom, one terminal of said generator being connected by the wire 18 to the return rail 2.

The service rail 1 of the track is divided into sections 19, 20, 21, insulated from one another, as shown at 22, 23, 24, 25. The feeder 17 is connected to said respective sections of the service or track rail 1, preferably near one end of said sections, by the wires 26, 27, 28. At the opposite ends of said track sections, respectively, the relay magnets 29, 30, 31, have their opposite terminals connected respectively, to said track sections 19, 20, 21, and to the opposite or return rail 2 of the track, by the wires 32, 33, 34, 35, 36, 37. It will be seen then that said relays 29, 30, 31, are connected in multiple from the generator 16 to the track sections 19, 20, 21, and in their normal condition are magnetized by current from said generator entering at one end of said respective track sections, passing over the length of said sections, magnetizing said relay magnets, and returning by the opposite or return rail 2. The secondaries, 38, 39, 40, of said transformers respectively, have one leg connected to said track sections 19, 20, 21, by the wires 41, 42, 43, and the opposite legs, respectively, to the third rail or contact sections 4, 5, 6, by the wires 44, 45 and 46, through the switches 53, 54, 55.

56 represents a motor car, locomotive or train driven by an alternating current motor 57. The car 56 is provided with the controller 58 and the current collecting shoe 59, which makes traveling contact with the sectional third rail 3.

Referring now to Fig. 1: the magnets 60, receiving current from the generator 61, through the feed wires 62, 63, and the branch conductors $68^b$, 98 76, 77, and 93, 94, control the switches 97 64, 65, which are arranged to open and close circuit in the legs 41, 42, 43, respectively of the secondaries 38, 39, 40 of the transformers 14, 15, as shown.

The switches 53, 75, are coupled together by the insulation 78; and in like manner the switches 54 and 73; and the switches 55 and 72 and the switches $75^a$ and $75^b$ are similarly coupled by the insulators 79 and 80 and $80^a$ respectively. Thus each of the relay magnets 29, 30, 31, operates two switches opening one and closing the other simultaneously. It will be noted that the circuits of the switches 72, 73, 75, are kept normally closed by the normally energized relays 29, 30, 31, and the switches 65, 64 and 97 are kept normally closed by the normally energized magnets 60 and 96.

The operation is as follows: When there is no car or train on the section the relay, 29 for instance, is magnetized as its normal condition, attracting its armature 53 and thus keeping the secondary 38 on open circuit at the contacts 82, and the switch 75 closed that is, there is no working or heavy current of any kind connected to the working or contact section 4; thus this contact section is dead. Now let the motor car 56 enter upon the section 5, for instance, with the controller 58 on closed circuit; the wheels and axles close circuit between the rail section 20 and the return rail 2, thus short circuiting the current from the magnet 30, and thus demagnetizing said magnet, which instantly releases its armature 54, thus closing circuit at the contacts 82 and connecting the leg 45 of the secondary 39 to the contact section 5. The closing of circuit through the car controller 58 completes the circuit of the secondary 39 and thus furnishes working current to the motor 57, thus driving the car 56.

It will be seen that as soon as the car 56 leaves the block 20 the short circuit is instantly removed from the magnet 30; the current returns thereto it reattracts its armature 54, thus opening circuit at the contact points 82 and disconnecting the leg 45 of the secondary 39 from the contact section 5, thus rendering said section dead. When the magnet 30 releases its armature and closes circuit at 82, as described, that movement also reverses the switch 73, thus opening, at the contacts 83, the circuit of the magnet 60. The latter magnet then instantly releases its armature 65, thus opening circuit at the contacts 84 in the leg 43 of the secondary 40.

Assuming the car or train to be moving from left to right, it will be seen that by this arrangement when a train or car enters upon the section 5, deënergizing the relay 30, it thus instantly opens the circuit of the secondary 40, at the contacts 84, thus cutting off the possibility of working current reaching a train on the section 21, thus insuring a neutral or dead condition of the contact section 6. That is, a dead section is always kept between two trains running on the same track in the same direction; and even if a following train, by reason of its momentum, should enter upon said section 21 by coasting, it would nevertheless lose current the instant it entered upon said section, because of its supply circuit 40 being kept open at the contacts 84 by the preceding train. Nevertheless, on entering said section 21 the train would actuate the circuit instrument C, thus cutting off current from the section at its rear, controlled by the magnet 60ª.

It is evident that by the means described, a car or train, whether running or stopped, or blocked for any reason, will automatically protect itself from a rear end collision, by depriving a following train of working current.

While the above describes the system especially as applied to double track roads, it will be understood that trains can be run in the opposite direction, when necessary, on the track as described. Thus if the train or car 56 be run from right to left it will receive working current from the secondary 39 until the last truck has left the section 20. At that instant the circuit instrument B is reversed thus closing circuit through the magnet 60 and the legs 43 of the secondary 40, thus continuing current to the moving train.

It will be noted that the first pair of wheels entering upon the track section 21 actuates the circuit instrument C, thus closing circuit in the leg 46 of the secondary 40.

It will be observed that the voltage of the current used in vitalizing the track relays 29, 30, 31, is necessarily very low, the well known varying conditions of weather, leakage, &c., precluding the use of a high potential current in this situation. The gap formed by the relay armature lever, therefore, when opened, is comparatively slight; whereas, the gap formed in opening a working circuit carrying a propulsion current of six hundred or more volts must be comparatively wide in order to instantly break circuit completely and prevent the formation of a destructive arc when such a circuit is opened. For the above reason the track relay does not furnish the most reliable means for directly opening the working circuit under full current, without danger of injuring the relay. I therefore introduce intermediate or additional circuits, as illustrated, especially at 38ª, 39ª, 40ª, Fig. 2, carrying heavier currents than the low potential current actuating the relays A, B, C, but of much lower potential than that of the high potential working current. Said intermediate circuits are under direct control of said relays, which operate to open and close said intermediate circuits at 83. These intermediate circuits include the switch magnets 60, 87, which directly actuate and control the working circuits, as shown. These switch magnets in said intermediate circuits are much more powerful than the track relays and of sufficient strength to control the opening and closing of the long gap formed in opening the working circuits. The current used for vitalizing said switch magnets 60, 87, however, is of sufficiently low voltage to preclude danger or injury to persons or to the contact points 83, in the intermediate circuits controlled by said relays. In this case the switches 55 and 72, for instance, shown in Fig. 1 as mechanically connected, are shown in Fig. 2 as mechanically separated, and the auxiliary magnet 87 is introduced to directly actuate the switch 55 in the leg 46 of the working secondary 40. By this arrangement a greater opening and more positive action in the working circuit at the contact points 86, are obtained than when the switch in the working circuit is actuated directly by the low potential track relay. Where the alternating current is used for energizing the magnets, it will be understood that the magnets are to be adapted for the use of that kind of current. Resistances 92 are placed in the branch wires 26, 27, 28, in order to prevent a train on one track section from short circuiting current carried by the feeder 17 from any other track section. The springs 95 are intended to retract the armature levers in the usual way when the magnets controlling said levers are deënergized.

This system is readily arranged in such a way that a train having taken possession of a given section will not only cut off current from the section to its rear but will automatically cause the motor circuit to be closed on itself of any train entering upon said rear section through momentum or otherwise, thus converting said motors into electric generators and thereby converting the momentum of the train into braking energy, when said motors are suitably constructed and arranged to be thus converted into generators. This result is accomplished by simply making an electrical connection, by the wires 89, between the back stops 66 of the switches 97, 64 and 65 and the legs 44, 45 and 46, respectively, of the working secondaries or feeders 38, 39 and 40.

To illustrate the operation: Assume that the train 56 occupies the section 20, as shown. Its presence has deënergized the magnet 60 controlling the switch 65, by opening its circuit at 83, thus releasing said switch, as already described. The switch 65, thus released has closed circuit upon its back stop 66, thus cutting off the current generator 40 and connecting electrically the disconnected section of the leg 43 and the leg 46 thereof. Now let a train, carried by its momentum or otherwise, with its controller closed enter upon the section 21. Instantly the relay 31 is demagnetized by the short circuiting wheels and axles, as heretofore described, thus opening the circuit of the magnet 87, whereby the released switch 55 instantly closes circuit between the contacts at 86. That is, electrical connection is thus completed between the service rail section 21 and the contact section 6, outside of the train. From this the circuit is continued through the motor system of the train by way of the collecting shoe, the controller, the motors, and the axle and wheels to the rail section 21, thus completing the circuit through the motors, with the feeder cut off, and thereby causing the motor circuit of the train to be closed upon itself.

It will be understood that the higher the speed and the greater the momentum of the train the greater will be the braking power generated to stop it. This braking power gradually diminishes, as the speed decreases, until the train comes to a complete standstill. As soon as the car or train 56 clears the section 20, the magnet 60 is instantly energized, and, attracting the switch 65 closes circuit at the contacts 84, thus opening the braking circuit and restoring propulsion current to the train arrested on the section 21, which may now proceed on its way.

It will be understood that the described stopping and starting of the following train is done automatically by the mere presence of a train on the section 20, and without any volition or action on the part of the driver of said following train. It will be seen that by the means described rear-end collisions may be automatically prevented.

By opening the hand controlled switch 101$^a$ in the leg 43 of the secondary 40, and connecting it to the button 90, which is connected by the wire 88 to the other leg 46 of said secondary, the current connection is cut off from the section 21, and the braking circuit closed through the motors of any train which may enter upon said section, in the same manner as already described in connection with the automatic application of braking power to said train. The switch 101$^a$ may be used as an emergency switch to stop a train approaching a station or a train after it has left a station. Said switch may be placed at any desired or convenient point, at a station, for instance, or on a post by the road side where track men or others having work to do on the system may operate said switch and thus cut off current from an approaching train and apply braking power to stop the same, as described. The hand controlled switch 101 is placed in one of the legs of the secondary furnishing current to the sectional conductors, whereby the opening of said switch will prevent the accession of working current to said conductors. In Fig. 1, in the secondary 40, this switch is shown as placed in the leg 43 connected to the traction rail section, while, in the secondary 39 the switch is located in the leg 45 connected to the third rail section. The switch is equally effective in either location.

It will be understood that the current may be cut off from the contact conductor, and braking power applied to a car or train in contact therewith, through its motors, in the manner substantially as described herein, whether said car or train be operated by a direct or an alternating current.

Having thus described my invention, what I claim as new and desire to secure by Letters Patent, is:

1. In an electric railway system embodying a sectional working or contact conductor, a source of working current supply normally disconnected from said working sections, a car or train, means actuated thereby on entering upon a section or block, for connecting said current supply thereto, means under control of said car or train for automatically opening circuit in the feed connection furnishing working current to a different working section or block, a second electrically propelled car or train, and means under control thereof, connected to said last named section or block, for causing said car or train, on entering thereupon, to close its own motor circuit upon itself.

2. In an electric railway system having sectional working or contact conductors, a source of working current supply normally disconnected from said working sections, means for automatically connecting said current supply to said sections and disconnecting the same therefrom, a car or train occupying one of said sections or blocks, means under control thereof for automatically preventing the accession of working current to a working section or block in the rear of the block occupied by said car or train, a second or following, electrically propelled, car or train, and means under control thereof, on entering upon said rear section or block, for causing said train to close its own motor circuit upon itself.

3. In an electric railway system comprising a sectional working or contact conductor, a high voltage alternating current generator, leaders therefrom, transformers having their primaries connected thereto, the secondaries thereof, respectively, having one terminal arranged for connection to the working sections, but normally disconnected therefrom, and the opposite terminal normally connected to the return for the working current, a car or train, means for connecting said secondaries operatively to said working sections upon the entrance of said car or train thereon, means under control of said car or train on one block for opening circuit in the secondary feeder arranged to supply current to another block or section, a second car or train provided with motors, and means for causing said train, on entering upon the last named section or block, to close circuit between the working and return conductors thereof, thus closing its own motor circuit upon itself.

4. In an electric railway system, a sectional working or contact conductor, a source of working current supply normally disconnected from said sections, a plurality of automatic switches for connecting said current supply operatively to said respective working sections and disconnecting the same therefrom, one of said switches being normally open, a car or train operating to close the same on entering upon the section or block with which said switch is connected, and another of said switches normally closed, connected to the same section or block and arranged to be opened by said car or train on entering upon the next section or block in advance, a second or following train provided with a motor circuit, means connected to said first named section or block for depriving said following train of working current, and means for causing said second train to close its own motor circuit upon itself on its entrance upon the block in the rear of said first named section or block, and means connected to said rear section or block for causing said second train to automatically prevent the accession of working current to the section or block in its own rear.

5. In an electric railway system having sectional working or contact conductors, a source of working current supply normally disconnected from said sectional conductors, a car or train, means under control thereof for automatically connecting the working current feeder to the working sections in succession on the entering of said train upon said sections, and disconnecting the same therefrom when the train leaves said respective sections, means under control of said train on entering upon one working section, for preventing the accession of working current to another working section, a second electric car or train, and means connected with the latter section or block for causing said second train, on entering thereupon, to close direct circuit between the working section of said block and its return, whereby said train will be caused to close its own motor circuit upon itself.

6. An electric railway system comprising a railroad track having one rail formed in sections insulated or separated from one another, means for furnishing current to said track sections, the opposite rail forming a return for said current, relay magnets having their opposite terminals, respectively, connected to said rail sections and to said return, a sectional working or contact conductor, a high voltage alternating current generator, leaders therefrom, step-down transformers having their primaries connected thereto, the secondaries of said transformers being arranged to furnish working or propulsion current to the sections of said sectional contact conductor, additional circuits under control of said relays, switch magnets therein arranged to control the opening and closing of the circuits of said secondaries, the traction rail sections forming the returns for said secondaries, a car or train, the presence thereof on a section or block operating to open the circuit of the secondary furnishing working or propulsion current to a different working or contact section or block, through the agency of said additional circuit, thereby preventing the accession of propulsion current to said last named working section.

7. An electric railway system comprising normally closed sectional traction rail circuits, current feeders connected to the opposite rails of said circuits, relay magnets having their opposite terminals connected to said opposite rails, a working or contact conductor formed in sections separated or insulated from one another, a working current generator having one terminal normally disconnected electrically from said contact sections and the other normally connected to a return consisting of a section of the traction rails corresponding to the working sections, switches arranged to connect said working current generator to said working or contact sections, magnets for controlling the operation of said switches, and means for energizing said switch magnets by means of an additional current stronger than that used for energizing said relays, said relays controlling the admission of current to said switch magnets.

8. An electric railway system comprising normally closed sectional traction rail circuits, current feeders connected to the opposite rails of said circuits, relay magnets having their opposite terminals connected to said opposite rails, a working or contact conductor formed in sections separated or insulated from one another, an alternating current generator, leaders therefrom, step-down transformers having their primaries connected to said leaders, the secondaries of said transformers, respectively, having one terminal normally connected to said respective traction rail sections, and the other normally disconnected electrically from said contact sections, but arranged for connection thereto, switches in the circuits of said secondaries, magnets for controlling the operation of said switches, means for energizing said switch magnets by means of a current stronger than that used for energizing said relays, said relays controlling the admission of current to said switch magnets, and said traction rail sections forming returns for said secondary or working current.

9. In an electric railway system comprising a sectional working or contact conductor, a source of working current supply normally disconnected from said sections, a plurality of independent automatic switches for connecting said current supply operatively to said respective working sections, one of said switches being normally open and under control of a train or car on the section with which it is connected, and another switch normally closed and arranged for control by a train or car on a different section, and means under control of a car or train on one section for electrically connecting an adjacent working conductor section and its traction rail return, whereby the motor circuit of a train entering upon said last named section may be closed upon itself.

WILLIAM ROBINSON.

Witnesses:
GEORGE H. HALE,
EMELYN WILSON.